United States Patent
Heinen et al.

(10) Patent No.: US 6,689,179 B2
(45) Date of Patent: Feb. 10, 2004

(54) DEVICE FOR DETERMINING AT LEAST ONE PARAMETER OF A FLOWING MEDIUM

(75) Inventors: Christian Heinen, Leinfelden-Echterdingen (DE); Thomas Lenzing, Benningen (DE); Klaus Reymann, Gerlingen (DE); Uwe Konzelmann, Asperg (DE); Andy Mikleuschewitsch, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,289

(22) PCT Filed: Apr. 18, 2001

(86) PCT No.: PCT/DE01/01492

§ 371 (c)(1),
(2), (4) Date: Mar. 8, 2002

(87) PCT Pub. No.: WO01/79790

PCT Pub. Date: Oct. 25, 2001

(65) Prior Publication Data

US 2003/0010209 A1 Jan. 16, 2003

(30) Foreign Application Priority Data

Apr. 18, 2000 (DE) .......................................... 100 19 149

(51) Int. Cl.$^7$ ............................................... B01D 45/06
(52) U.S. Cl. ....................... 55/385.3; 55/397; 55/461; 96/413; 96/417; 73/202.5
(58) Field of Search .......................... 55/307, 461, 392, 55/394, 397, 385.3; 95/267, 272; 96/413, 417; 73/202, 202.5

(56) References Cited

U.S. PATENT DOCUMENTS 6,332,356 B1 * 12/2001 Hecht et al. ............... 73/202.5

* cited by examiner

Primary Examiner—Robert A. Hopkins
(74) Attorney, Agent, or Firm—Ronald E. Greigg

(57) ABSTRACT

Devices for measuring at least one parameter of a medium flowing in a line, having an inlet conduit an outlet conduit, having the disadvantage in the prior art that liquids flowing into the inlet conduit can reach a measurement element and alter the measurement characteristic curve behavior of the measurement element. A device of the invention has, between the inlet conduit and outlet conduit, a deflection conduit with a separation element, by which the liquids are separated out and therefore do not reach the measurement element.

22 Claims, 2 Drawing Sheets

DEVICE FOR DETERMINING AT LEAST ONE PARAMETER OF A FLOWING MEDIUM

CROSS-REFERENCE TO RELATED APPLICATIONS

This application is a 35 USC 371 application of PCT/DE 01/01492 filed on Apr. 18, 2001.

BACKGROUND OF THE INVENTION

1. Field of the Invention

The invention is based on a device for determining at least one parameter of a flowing medium and on a method for separating a liquid from a medium flowing in a line.

2. Description of the Prior Art

A device with a measurement conduit is already known (German Patent Disclosure DE 197 35 891 A1) in which a measurement element is accommodated that is bathed there by the inflowing medium. The medium flows from an inlet conduit first into a deflection conduit, which has a larger flow cross section than the inlet conduit and has a right-angled corner, so that there is an abrupt flow transition in the form of a step to the inlet conduit. Next, deflected by the corner of the deflection conduit, the medium flows along the peripheral face of the deflection conduit into an outlet conduit adjoining it transversely and leaves the outlet conduit through an outlet opening and then mixes again with the medium flowing past the device.

An inlet conduit longitudinal axis and an outlet conduit longitudinal axis are inclined by a predetermined angle from the longitudinal axis of the line, so that the inlet conduit has a region that is shaded from a main flow direction. The measurement element is disposed in the shaded region of the measurement conduit, to prevent soiling and resultant defects in the measurement element.

Water entering the intake line, for instance if the roadway is wet with rain, can sometimes cause contamination of the measurement element. Natural components of dissolved salts contained in this splashing water then cause a drift in the characteristic curve of the measurement element, because of the formation of a salt crust on the diaphragm of the sensor part. Although the inclination of the measurement body does form a partitioned-off region, nevertheless liquid particles reach the measurement conduit.

From German Patent Disclosure DE 197 41 031 A1, a measuring device with an inlet conduit is known in which a speeding up of the flow in the inlet conduit can be maintained by the design of two walls of the inlet conduit, but it is known that this leads only to stabilizing the flow of the medium in the inlet conduit, in particular in the measurement conduit.

SUMMARY OF THE INVENTION

The device and method according to the invention have the advantage over the prior that a measurement element is protected against liquid in a simple way.

It is advantageous to embody a liquid separation element in a conduit at least partly in labyrinthine fashion, because in this way liquid can be separated out yet liquid from the outside cannot penetrate into the conduit.

It is advantageous to embody the liquid separation element in an inner wall of a deflection conduit of the device, because this improves the separation.

Internested annular-arclike elements, which are simple to produce from a technical standpoint, are an advantageous embodiment of the liquid separation element.

It is advantageous to increase the flow resistance of the liquid separation element compared to the flow resistance of a measurement conduit, because as a result the great majority of the gaseous component of the flowing medium remains in the measurement conduit.

It is also advantageous to provide a deflection conduit in the inlet conduit that deflects the flow from the inner wall, because the deflection of the flow is facilitated thereby.

For good separation of liquid, it is advantageous that there is a detachment edge in the deflection conduit, which prevents deposited water from moving in the form of a wall film into the measurement conduit.

To stabilize the measurement signal, it is advantageous that the flow cross section of the inlet conduit and/or the outlet conduit narrows in the flow direction.

BRIEF DESCRIPTION OF THE DRAWING

Exemplary embodiments of the invention are explained in further detail in the ensuing description, taken with the drawings, in which.

DESCRIPTION OF THE PREFERRED EMBODIMENTS

Figure 1:
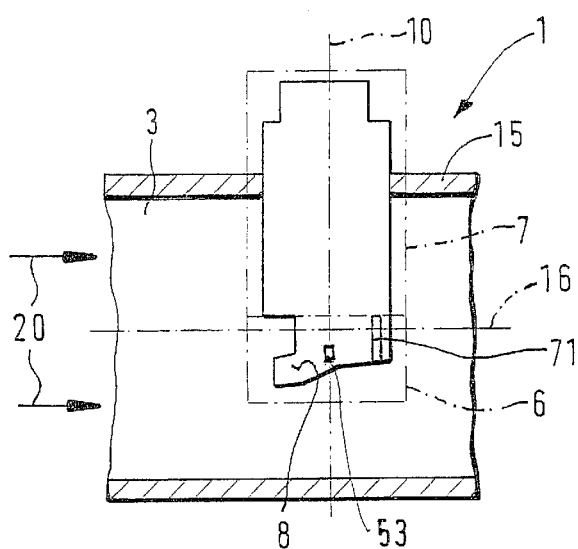
FIG. 1 is a fragmentary elevation view, partly in section, of a device according to the invention.

FIG. 1 schematically shows how a device 1 of the invention is incorporated in a conduit or line 3 within which the medium, which is a gas-liquid mixture, flows.

The device 1 comprises a measurement housing 6, represented by a lower rectangle drawn in dot-dashed lines, and a carrier housing 7, represented by an upper rectangle drawn in dot-dashed lines, in which latter housing an electronic evaluation unit, for instance, is accommodated. The measurement housing 6 and carrier housing 7 can merge integrally with one another or can be individual parts that are joined together. The measurement housing 6 and the carrier housing 7 have a common longitudinal axis 10, which can for instance also be a center axis. The carrier housing 7 for instance protrudes partway out of the line 3.

The measurement housing 6 has a side face 8, which is located in the plane of the drawing.

The device 1 is introduced, for instance in plug-in fashion, into a wall 15 of the line 3. The plastic or metal wall 15 defines a flow cross section, in the center of which a center axis 16 extends in the direction of the flowing medium, parallel to the wall 15. The direction of the flowing medium, hereinafter called the main flow direction, is indicated by corresponding arrows 20 and extends from left to right in the drawing.

Figure 2:
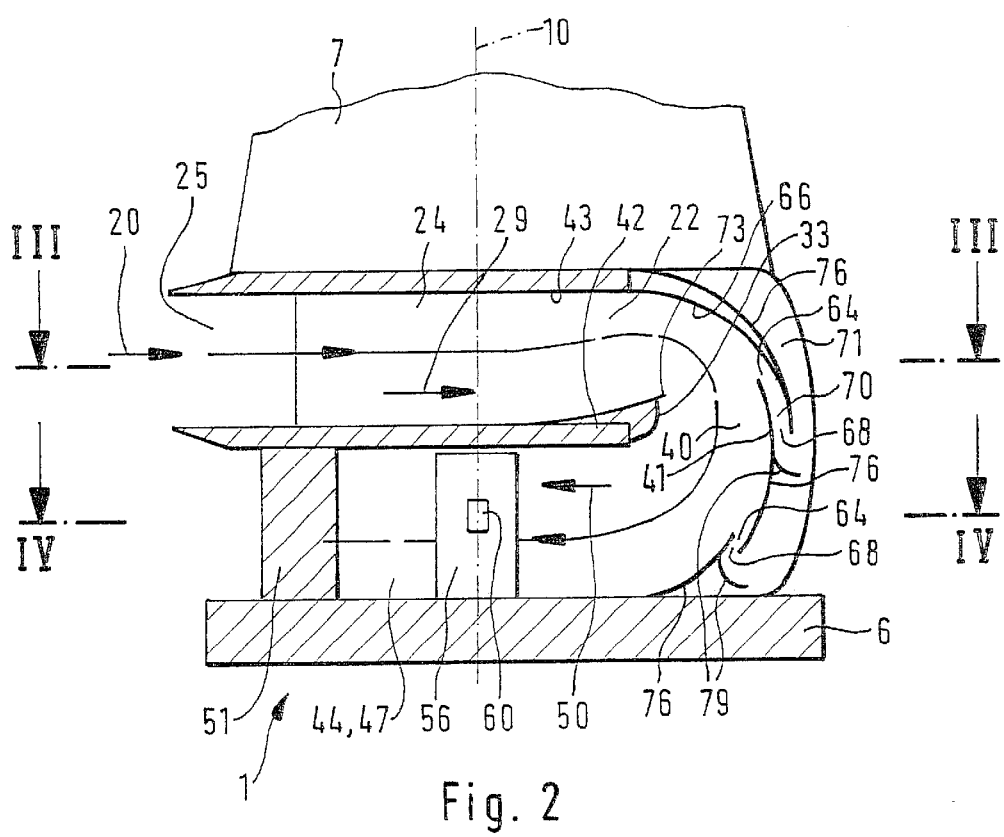
FIG. 2 is a detail of a section through FIG. 1.

FIG. 2 shows the plan view on the measurement housing 6 in a sectional plane parallel to the plane of the drawing in FIG. 1, with a conduit 22 that has an inlet conduit 24 into which the medium flows through an inlet opening 25. There is an inlet conduit flow direction 29 in the inlet conduit 24. Disposed at the end of the inlet conduit 24 is a deflector element 33, which deflects the flow from an inner wall into a deflection conduit 40, which causes a detachment downstream and improves a phase separation of the individual mixture components. In the deflection conduit 40, the flowing medium is deflected and flows into an outlet conduit 44, which at least in part also forms a measurement conduit 47. An outlet conduit flow direction 50 prevails in the outlet conduit 44. In the measurement conduit 47, the medium flows past at least one measurement element 60, which is disposed on a sensor carrier 56. At the end of the outlet conduit 44, the medium strikes an outflow element 51, as a result of which the medium is deflected and thus flows back into the line 3. By means of the outflow element 51, the flow direction of the medium in the outlet conduit 44 is rotated at least partway around the longitudinal axis 10. The medium emerging through at least one outlet opening 53 (FIG. 4) then flows approximately in the main flow direction 20. This improves the measurement signal performance in the case of reverse flows.

The outlet opening 53 or the outlet conduit 44 can, however, also be designed as in DE 197 41 031 A1, which is hereby incorporated by reference.

Disposed in the deflection conduit 40 on its outer periphery is a separation element 70, which is embodied, for instance on its inner wall 41 facing in the main flow direction 20, in labyrinthine fashion. The separation element 70 has at least one separation inlet 64 and at least one separation outlet 68, which connect the deflection conduit 40 with the line 3 and through which a liquid separated out at the wall passes out of the deflection conduit 40 into the line 3.

To prevent too much gas from leaving the inlet conduit 24 through the separation element 70, the flow resistance of the separation element 70 is increased over that of the inlet conduit 24 and outlet conduit 44.

A sharp outflow edge 73 is disposed in the inlet conduit 24 or in the deflection conduit 40, for instance on the deflector element 33; this edge prevents a liquid, such as water, deposited on a lower side wall 42 of the inlet conduit 24 from participating in the deflection in the measurement conduit 47 in the form of a wall film in the direction of the measurement element 60. The wall film detaches at the outflow edge 73 from the side wall 42 of the inlet conduit 24 and is entrained by the flow. Because of the greater inertia of the liquid compared to the gas, the liquid strikes the inner surface of the outer wall 41 of the deflection conduit 40, for instance, where it can form a wall film again. This wall film migrates through the separation inlet 64 into the separation element 70 and leaves it through the separation outlet 68 into a rear chamber 71. The medium that is deflected in the deflection conduit 40 and forced against the inner wall 41 by centrifugal forces pushes the wall film into the separation inlet 64 in the process. At an upper side wall 43 of the inlet conduit 24, which is opposite the lower side wall 42, for instance, the wall film need not detach from the side wall but instead is pushed directly into the separation inlet 64.

Liquids in the conduit 22 that do not form any wall film strike the inner wall 41 and are thereby separated out of the conduit 22.

The labyrinthine separation element 70 for instance comprises three annular-arc elements 76, which are internested. At least one shunt 79 is disposed in the region of the separation outlets 68 and protects against water or liquid entering from the line 3.

Figure 3:
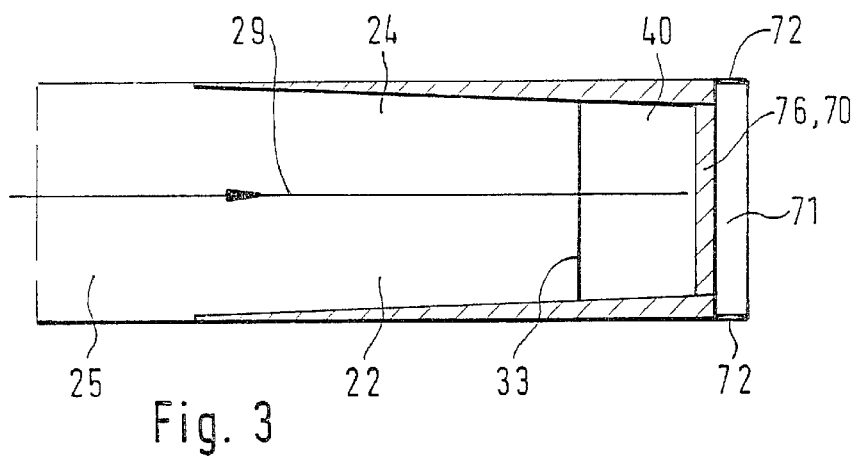
FIG. 3 is a section taken along the line III—III of FIG. 2.

FIG. 3 shows a section taken long the III—III of FIG.

The conduit 22 narrows in the inlet conduit 24 in the flow direction 29, so that a stabilization of the flow takes place.

The rear chamber 71, on the side face 8 along the longitudinal axis 10, has slits 72 through which the liquid that has been separated out returns to the conduit 3, in which the liquid no longer causes any negative effects.

Figure 4:
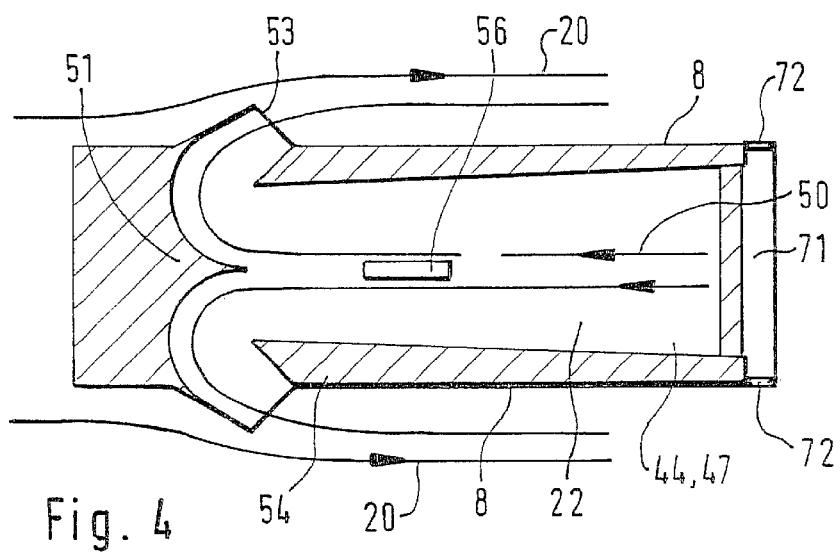
FIG. 4 is a section taken along the line IV—IV of FIG. 2.

FIG. 4 shows a section taken along the line IV—IV of FIG. 2.

The outlet conduit 44 also narrows in the outlet conduit flow direction 50. Once the flowing medium has flowed past the sensor carrier 56 with the measurement element 60, it strikes the outflow element 51. The outflow element 51 is embodied in the shape of a W, for instance, and deflects the outlet flow direction 50, so that the medium, through at least one outlet opening 53, enters the line 3 again and flows onward in the main flow direction 20 again. In this exemplary embodiment, there are two outlet openings 53.

The outflow element 51 protrudes past a side face 54 of the measurement housing 6. The primary flow 3 creates a negative-pressure zone (detachment) at the outflow element 51 in the region of the outlet opening 53 and thus exerts suction on the flow in the measurement conduit 44. Because the outflow element 51 protrudes past the side fact 54, a reverse flow that is present in some phases is fed into the measurement conduit 44 and measured.

Figure 5:
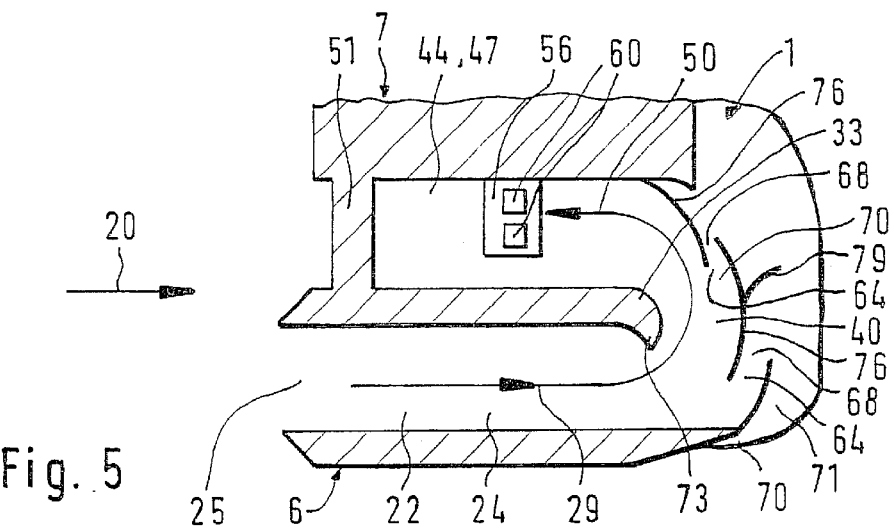
FIG. 5 is a further exemplary embodiment of the device of the invention.

FIG. 5 shows a further exemplary embodiment of the device 1 of the invention. The difference from the exemplary embodiment of FIG. 2 is essentially that the outlet conduit 44 is the closest to the carrier housing 7, and the inlet conduit 24 is disposed on a lower end of the measurement housing 6. Also, the sensor carrier 56 has two measurement elements 60, which measure the volumetric flow and the pressure, for instance.

The foregoing relates to preferred exemplary embodiment of the invention, it being understood that other variants and embodiments thereof are possible within the spirit and scope of the invention, the latter being defined by the appended claims.

What is claimed is:

1. A device (1) for determining at least one parameter of a medium flowing in a line (3) in a main flow direction (20), the medium comprising a gas-liquid mixture, the device comprising:

a measurement housing (6) in the line (3);

a conduit (22) that is disposed in the measurement housing (6) and has the following properties:

the conduit (22) being divided into an inlet conduit (24), a deflection conduit (40), and an outlet conduit (44) and having an inlet opening (25), which is adjoined by the inlet conduit, which in turn is adjoined by the deflection conduit (40), into which the medium flows from the inlet conduit (24) and is deflected, and then flows through the outlet conduit (44) to at least one outlet opening (53), discharging into the line (3) at an outer face (8, 54) of the measurement housing (6), one part of the conduit (22) forming a measurement conduit (47), at least one measurement element (60) that is located in the measurement conduit (47) and is bathed by the flowing medium, and a liquid separation element (70) integrated with the deflection conduit (40), said liquid separation element (70) is embodied at least in part in labyrinthine fashion and has at least one separation inlet (64) and at least one separation outlet (68).

2. The device of claim 1, wherein the liquid separation element (70) is embodied in the region of an inner wall (66) of the deflection conduit (40).

3. The device of claim 1, wherein the flow resistance of the liquid separation element (70) is increased compared to the flow resistance of the measurement conduit (47) due to the change in contouring.

4. The device of claim 1 wherein the device (1) has the measurement housing (6) and a carrier housing (7);
wherein the measurement housing (6) and the carrier housing (7) have a longitudinal axis (10);
wherein the inlet conduit (24) and the outlet conduit (44) are disposed one above the other along the longitudinal axis (10); and
wherein the inlet conduit (24) is the closest to the carrier housing (7).

5. The device of claim 1 wherein
a flow cross section of the inlet conduit (24) narrows in the flow direction (29) toward the deflection conduit (40).

6. The device of claim 1 wherein
the flow cross section of the outlet conduit (44) narrows in the flow direction (50) toward the outlet opening (53).

7. The device of claim 1 wherein
at least one part of the inlet conduit (24) and at least one part of the outlet conduit (44) extend inclined relative to the main flow direction (20).

8. The device of claim 1 wherein
The flow direction of the medium in the outlet conduit (44) is rotated at least partway around the longitudinal axis (10).

9. The device of claim 1, wherein
the gas-liquid mixture is aspirated air for an internal combustion engine.

10. A device (1) for determining at least one parameter of a medium flowing in a line (3) in a main flow direction (20), the medium comprising a gas-liquid mixture, the device comprising:
a measurement housing (6) in the line (3);
a conduit (22) that is disposed in the measurement housing (6) and has the following properties:
the conduit (22) being divided into an inlet conduit (24), a deflection conduit (40), and an outlet conduit (44) and having an inlet opening (25), which is adjoined by the inlet conduit, which in turn is adjoined by the deflection conduit (40), into which the medium flows from the inlet conduit (24) and is deflected, and then flows through the outlet conduit (44) to at least one outlet opening (53), discharging into the line (3) at an outer face (8, 54) of the measurement housing (6), one part of the conduit (22) forming a measurement conduit (47),
at least one measurement element (60) is located in the measurement conduit (47) and is bathed by the flowing medium, and
a liquid separation element (70) integrated with the deflection conduit (40),
said liquid separation element (70) is embodied in the region of an inner wall (66) of the deflection conduit (40).

11. The device of claim 10 wherein the device (1) has the measurement housing (6) and a carrier housing (7);
wherein the measurement housing (6) and the carrier housing (7) have a longitudinal axis (10);
wherein the inlet conduit (24) and outlet conduit (44) are disposed one above the other along the longitudinal axis (10); and
wherein the inlet conduit (24) is the closest to the carrier housing (7).

12. The device of claim 10 wherein
a flow cross section of the inlet conduit (24) narrows in the flow direction (29) toward the deflection conduit (40).

13. The device of claim 10 wherein
the flow cross section of the outlet conduit (44) narrows in the flow direction (50) toward the outlet opening (53).

14. The device of claim 10 wherein
at least one part of the inlet conduit (24) and at least one part of the outlet conduit (44) extend inclined relative to the main flow direction (20).

15. The device of claim 10, wherein
the gas-liquid mixture is aspirated air for an internal combustion engine.

16. A device (1) for determining at least one parameter of a medium flowing in a line (3) in a main flow direction (20), the medium comprising a gas-liquid mixture, the device comprising:
a measurement housing (6) in the line (3);
a conduit (22) that is disposed in the measurement housing (6) and has the following properties:
the conduit (22) being divided into an inlet conduit (24), a deflection conduit (40), and an outlet conduit (44) and having an inlet opening (25), which is adjoined by the inlet conduit, which in turn is adjoined by the deflection conduit (40), into which the medium flows from the inlet conduit (24) and is deflected, and then flows through the outlet conduit (44) to at least one outlet opening (53), discharging into the line (3) at an outer face (8, 54) of the measurement housing (6), one part of the conduit (22) forming a measurement conduit (47),
at least one measurement element (60) is located in the measurement conduit (47) and is bathed by the flowing medium, and
a liquid separation element (70) integrated with the deflection conduit (40),
said liquid separation element (70) is formed by at least two internested annular-arclike elements (76).

17. The device of claim 16 wherein the device (1) has the measurement housing (6) and a carrier housing (7);
wherein the measurement housing (6) and the carrier housing (7) have a longitudinal axis (10);
wherein the inlet conduit (24) and outlet conduit (44) are disposed one above the other along the longitudinal axis (10); and
wherein the outlet conduit (44) is the closest to the carrier housing (7).

18. The device of claim 16 wherein
a flow cross section of the inlet conduit (24) narrows in the flow direction (29) toward the deflection conduit (40).

19. The device of claim 16, wherein
the gas-liquid mixture is aspirated air for an internal combustion engine.

20. A device (1) for determining at least one parameter of a medium flowing in a line (3) in a main flow direction (20), the medium comprising a gas-liquid mixture, the device comprising:

a measurement housing (6) in the line (3);
a conduit (22) that is disposed in the measurement housing (6) and has the following properties:
 the conduit (22) being divided into an inlet conduit (24), a deflection conduit (40) and an outlet conduit (44) and having an inlet opening (25), which is adjoined by the inlet conduit, which in turn is adjoined by the deflection conduit (40), into which the medium flows from the inlet conduit (24) and is deflected, and then flows through the outlet conduit (44) to at least one outlet opening (53), discharging into the line (3) at an outer face (8, 54) of the measurement housing (6), one part of the conduit (22) forming a measurement conduit (47),
 at least one measurement element (60) is located in the measurement conduit (47) and is bathed by the flowing medium, and
 a liquid separation element (70) integrated with the deflection conduit (40),
 the device further comprises a deflector element (33) in a downstream end of the inlet conduit (24).

21. The device of claim 20, further comprising a detachment edge (73) on the deflector element (33).

22. The device of claim 20, wherein the gas-liquid mixture is aspirated air for an internal combustion engine.

* * * * *